(12) United States Patent
Loccufier et al.

(10) Patent No.: US 10,655,027 B2
(45) Date of Patent: *May 19, 2020

(54) FREE RADICAL RADIATION CURABLE LIQUIDS FOR DE-INKING SUBSTRATES

(71) Applicant: AGFA GRAPHICS NV, Mortsel (BE)

(72) Inventors: Johan Loccufier, Mortsel (BE); Stefaan Smet, Mortsel (BE)

(73) Assignee: AGFA GEVAERT NV, Mortsel (BE)

( * ) Notice: Subject to any disclaimer, the term of this patent is extended or adjusted under 35 U.S.C. 154(b) by 281 days.

This patent is subject to a terminal disclaimer.

(21) Appl. No.: 14/419,679

(22) PCT Filed: Aug. 21, 2013

(86) PCT No.: PCT/EP2013/067376
§ 371 (c)(1),
(2) Date: Feb. 5, 2015

(87) PCT Pub. No.: WO2014/033028
PCT Pub. Date: Mar. 6, 2014

(65) Prior Publication Data
US 2015/0210875 A1     Jul. 30, 2015

Related U.S. Application Data

(60) Provisional application No. 61/696,316, filed on Sep. 4, 2012.

(30) Foreign Application Priority Data

Aug. 27, 2012 (EP) .................................. 12181849

(51) Int. Cl.
| C09D 11/30 | (2014.01) |
| C09D 11/101 | (2014.01) |
| B08B 3/08 | (2006.01) |
| B41M 7/00 | (2006.01) |

(52) U.S. Cl.
CPC ............. C09D 11/30 (2013.01); B08B 3/08 (2013.01); C09D 11/101 (2013.01); B41M 7/0009 (2013.01)

(58) Field of Classification Search
CPC ......... C09D 11/30; C09D 11/101; B08B 3/08; B41M 7/0009
See application file for complete search history.

(56) References Cited

U.S. PATENT DOCUMENTS

| 3,732,107 A * | 5/1973 | Faust ...................... C08F 20/20 430/288.1 |
| 4,035,320 A | 7/1977 | Lawson |
| 4,070,259 A | 1/1978 | De Poortere et al. |
| 4,162,186 A | 7/1979 | Wood et al. |
| 5,314,580 A | 5/1994 | Di Tullio |
| 5,342,860 A | 8/1994 | Plotkin et al. |
| 5,356,979 A * | 10/1994 | Tai .......................... C08F 12/14 523/122 |
| 5,401,360 A | 3/1995 | Galland |
| 6,354,700 B1 * | 3/2002 | Roth ...................... B41J 2/0057 347/102 |
| 7,951,267 B2 | 5/2011 | Borch et al. |
| 2002/0156144 A1 | 10/2002 | Williams et al. |
| 2006/0054040 A1 * | 3/2006 | Daems ................... B41C 1/003 101/463.1 |
| 2006/0154033 A1 * | 7/2006 | Hopper ................ C09D 11/101 428/209 |
| 2007/0066699 A1 | 3/2007 | Kohno et al. |
| 2007/0172768 A1 * | 7/2007 | Kanna ................... G03F 7/0046 430/311 |
| 2008/0076043 A1 * | 3/2008 | Mori ..................... G03F 7/0007 430/7 |
| 2010/0007692 A1 * | 1/2010 | Vanmaele ............... B41C 1/003 347/21 |
| 2010/0133728 A1 * | 6/2010 | Yonezawa ............. B82Y 10/00 264/496 |
| 2010/0313782 A1 | 12/2010 | Loccufier et al. |
| 2010/0330296 A1 | 12/2010 | Loccufier et al. |
| 2011/0024392 A1 * | 2/2011 | Sato ..................... C09D 11/101 216/48 |
| 2011/0195194 A1 * | 8/2011 | Loccufier ............. C07C 381/12 427/427.4 |

FOREIGN PATENT DOCUMENTS

| EP | 0 703 282 A2 | 3/1996 |
| EP | 0 927 277 A1 | 7/1999 |
| EP | 2 053 100 A1 | 4/2009 |
| EP | 2 447 414 A1 | 5/2012 |
| JP | 54-160491 A | 12/1979 |

OTHER PUBLICATIONS

Tabuchi et al., machine English translation of JP 11-211941 (Aug. 1994).*
Official Communication issued in International Patent Application No. PCT/EP2013/067376, dated Mar. 5, 2014.

* cited by examiner

*Primary Examiner* — Jessica M Roswell
(74) *Attorney, Agent, or Firm* — Keating and Bennett, LLP

(57) ABSTRACT

A free radical radiation curable liquid includes a) a photoinitiator; and b) a monomer or oligomer including an alkali hydrolyzable group. The alkali hydrolyzable group is an oxalate group located in the atomic chain between two free radical polymerizable groups of the monomer or oligomer including the alkali hydrolyzable group.

14 Claims, No Drawings

FREE RADICAL RADIATION CURABLE LIQUIDS FOR DE-INKING SUBSTRATES

CROSS-REFERENCE TO RELATED APPLICATIONS

This application is a 371 National Stage Application of PCT/EP2013/067376, filed Aug. 21, 2013. This application claims the benefit of U.S. Provisional Application No. 61/696,316, filed Sep. 4, 2012, which is incorporated by reference herein in its entirety. In addition, this application claims the benefit of European Application No. 12181849.6, filed Aug. 27, 2012, which is also incorporated by reference herein in its entirety.

BACKGROUND OF THE INVENTION

1. Field of the Invention

The present invention relates to free radical radiation curable liquids for de-inking substrates, more particularly for de-inking substrates printed with free radical radiation curable inkjet inks.

2. Description of the Related Art

Sustainable development is a pattern of economic growth in which resource use aims to meet human needs while preserving the environment so that these needs can be met not only in the present, but also for generations to come. In the paper printing industry, a good recyclability of printed products is a crucial feature for the sustainability of the graphic paper loop.

Radiation curable inks allow printing on a wide range of substrates, including substantially non-absorbing substrates, such as e.g. glass and plastic packaging materials. The recyclability and re-use by de-inking substrates printed with radiation curable inks has proven to be more difficult than when printed with aqueous or solvent based inks.

Curing of radiation curable monomers and oligomers on paper and textile substrates results in a polymeric network entangled with the paper or textile fibres, making it difficult to separate the fibres from the polymer network in a paper recycling process.

In other cases, easily removable temporary inkjet prints are required on permanent substrates or objects. For example on a trade fair, advertisements or directions to a certain exhibition booth are printed on glass or concrete walls and floors and should afterwards be easily de-inked and re-printed with advertisements and directions for the next trade fair.

De-inking processes of aqueous or solvent based ink printed matter has been disclosed extensively. For example, U.S. Pat. No. 4,162,186 (DESOTO) discloses a de-inking process for removing ink and other substances from printed paper by using an aqueous de-inking solution containing a mixture of certain surfactants. Other methods for paper and textile recycling are disclosed in EP 927277 A (RHONE POULENC), U.S. Pat. No. 5,314,580 (MAUVIN), U.S. Pat. No. 5,401,360 (CENTRE TECHNIQUE) and EP 2447414 A (OFFICE2OFFICE).

In general, UV inks present difficulties during the de-inking of the printed paper by means of the conventional techniques, due to the excessive resistance to hydrolysis of the cross-linked film of ink.

U.S. Pat. No. 4,035,320 (UNION CAMP) discloses radiation curable, solventless printing inks including a reaction product of an equivalent excess of an acrylic type acid with a particular class of polyester polyol. Although a caustic treatment can be used for de-inking, the viscosity of these printing inks are around 10 Pa·s or more due to the polyacrylate reaction product, making them unsuitable for inkjet printing applications.

U.S. Pat. No. 4,070,259 (UCB) discloses radiation curable inks consisting essentially of Diels-Alder reaction products. The de-inking of paper printed with such UV inks can be improved by the choice of appropriate dienophiles, such as those containing phosphite, phosphate or amine radicals in their molecules or those derived from polyether- or polyester-polyols. The requirement that the radiation curable ink should consist essentially of Diels-Alder reaction products, limits the options for adjusting ink properties such as flexibility, abrasion resistance, viscosity, etc.

U.S. Pat. No. 7,951,267 (NOVOZYMES) discloses the use of certain lipolytic enzymes such as cutinases and lipases for de-inking purposes. The enzymatic treatment requires a neutral pH between about 6 and 8 for preserving the integrity of the enzymes. However, it would be advantageous to be able to use the common caustic treatment as in place for recycling paper from aqueous or solvent based ink printed matter and to avoid the use of expensive enzymes.

Radiation curable inks are also often used for outdoor applications, therefore any hydrolysis of radiation cured printed matter should preferably not occur at a neutral or acid pH, i.e. rain and acid rain.

SUMMARY OF THE INVENTION

Therefore, there is a need for radiation curable compositions that allow de-inking on a wide range of substrates, including paper and substantially non-absorbing substrates like glass, metal and polymeric substrates.

In order to overcome the problems described above, preferred embodiments of the present invention provide a free radical curable liquid as defined below.

It was surprisingly found, that the use of specific monomers and oligomers that include an alkali hydrolyzable group located in the atomic chain between two free radical polymerizable groups of the monomer or oligomer including an alkali hydrolyzable group allowed substrates printed with radiation curable ink to be easily de-inked.

Further advantages and benefits of the invention will become apparent from the description hereinafter.

DETAILED DESCRIPTION OF THE PREFERRED EMBODIMENTS

Definitions

The term "monofunctional" means that the monomer or oligomer includes one free radical polymerizable group.

The term "difunctional" means that the monomer or oligomer includes two free radical polymerizable groups.

The term "polyfunctional" means that the monomer or oligomer includes more than two free radical polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Free Radical Curable Liquids

The free radical radiation curable liquid in a preferred embodiment of the present invention contains: a) a photoinitiator; and b) a monomer or oligomer including an alkali hydrolyzable group; wherein the alkali hydrolyzable group is an oxalate group located in the atomic chain between two free radical polymerizable groups of the monomer or oligomer including an alkali hydrolyzable group.

The concept of the present invention is based on a redesign of the classical acrylate chemistry in order to come to an alkaline degradable network. Oxalate groups were found to be the most effective as alkali hydrolyzable groups for disintegrating a crosslinked polymeric network.

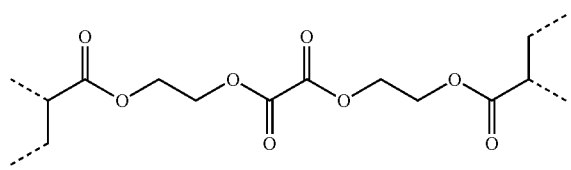

alkaline degradable crosslink

OH—— degradation in an alkaline solution

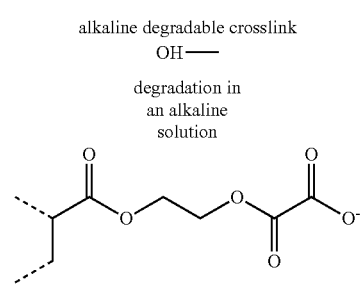

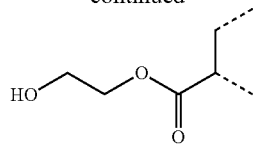

degradation of the network followed by dissolution of the resins

In a preferred embodiment, the free radical curable liquid is used as a primer and may form a transparent, translucent or opaque (e.g. white) cured layer on a substrate. Radiation curable inks, preferably radiation curable inkjet inks, can then be printed on the at least partially cured layer of the free radical curable liquid. These radiation curable inks can be standard radiation curable inks, but are preferably also radiation curable inks containing a photoinitiator and a monomer or oligomer including an alkali hydrolyzable group located in the atomic chain between two free radical polymerizable groups of the monomer or oligomer including an alkali hydrolyzable group. The application of a colourless or white free radical curable liquid on a porous paper or textile substrate can make the paper or textile substrate substantially non-absorbing for the radiation curable ink, thereby preventing entanglement of paper or textile fibres with the polymeric network of the cured radiation curable ink printed thereon. This allows for an easy removal of the radiation cured ink while producing "pure" paper or textile substrates and fibres.

The free radical curable liquid can also be applied as a varnish layer, e.g. on top of a layer of radiation curable (inkjet) ink. A combination of both primer and varnish made from the free radical radiation curable liquid according to a preferred embodiment of the invention is also possible.

In a preferred embodiment, the free radical radiation curable liquid is a free radical radiation curable liquid jettable by an inkjet print head.

In a preferred embodiment, the free radical radiation curable liquid includes a colorant. Such a free radical radiation curable liquid is usually called a free radical radiation curable ink. For the sake of clarity, in the referral to free radical radiation curable liquids here below, this referral includes free radical radiation curable inks, and more specifically also free radical radiation curable inkjet inks.

The colorant in the free radical radiation curable (inkjet) ink can be a dye but is preferably a pigment. The pigmented radiation curable ink preferably contains a dispersant, more preferably a polymeric dispersant, for dispersing the pigment. The pigmented radiation curable ink may contain a dispersion synergist to improve the dispersion quality and stability of the ink.

The advantage of using pigments instead of dyes reduces recycling problems, e.g. dyes tend to stick to paper fibres resulting in a lower quality of recycled paper. If the substrate is used as packaging material for food stuffs then pigments pose usually no migration problems, contrary to dyes may which can sometimes migrate into food resulting in issues of food safety or organoleptic nature.

The radiation curable liquids and inks according to a preferred embodiment of of the present invention are free radical polymerizable compositions. It was found in industrial inkjet printing systems that cationically curable inkjet inks posed problems of jetting reliability due to UV stray light. UV stray light hitting the nozzle plate of an inkjet print head results into failing nozzles due to clogging by cured ink in the nozzle. Unlike free radical ink where radical species have a much shorter lifetime, the cationic curable ink continues to cure once an acid species has been generated by UV light in the nozzle.

The radiation curable (inkjet) ink is preferably part of a radiation curable (inkjet) ink set. Such a curable ink set preferably includes at least one yellow curable ink (Y), at least one cyan curable ink (C) and at least one magenta curable ink (M) and preferably also at least one black curable ink (K). The curable CMYK-ink set may also be extended with extra inks such as red, green, blue, and/or orange to further enlarge the colour gamut. The CMYK ink set may also be extended by the combination of full density (inkjet) inks with light density (inkjet) inks. The combination of dark and light colour inks and/or black and grey inks improves the image quality by a lowered graininess.

In one preferred embodiment, a free radical curable liquid is used which includes a white pigment, more preferably an inorganic pigment with a refractive index greater than 1.60. The advantage of adding the white pigment to a radiation curable inkjet ink is that high resolution vibrant colour images can be obtained. By using a white radiation curable inkjet ink instead of a white free radical curable liquid primer, the white background can be applied in a high resolution. The white radiation curable inkjet ink can be applied on an at least partially cured primer layer or on the colour radiation curable inkjet inks. In the latter case, the colour image is viewed through a transparent primer layer and polymeric film, e.g. a transparent PET film.

In a preferred embodiment, the photoinitiator in the free radical radiation curable liquid is a polymeric or a polymerizable photoinitiator. This is especially advantageous for minimizing health risks in food packaging applications.

In a preferred embodiment, the free radical radiation curable liquid or (inkjet) ink includes one or more initiators selected from the group consisting of non-polymeric di- or multifunctional initiators, oligomeric initiators, polymeric initiators and polymerizable initiators; wherein the polymerizable composition of the radiation curable liquid or (inkjet) ink consists essentially of:

a) 25-100 wt % of one or more polymerizable compounds A having at least one acrylate group and at least one vinylether group;

b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B>24 wt %, then the weight percentage of compounds C>1 wt %; and wherein all weight percentages of A, B and C are based upon the total weight of the polymerizable composition.

In a more preferred embodiment of the above radiation curable liquid or (inkjet) ink, the photoinitiator in the free radical radiation curable liquid is a polymeric or a polymerizable photoinitiator.

The static surface tension of a jettable free radical radiation curable liquid is preferably from 20 to 40 mN/m, more preferably from 22 to 35 mN/m. It is preferably 20 mN/m or more from the viewpoint of printability by a radiation curable inkjet ink, and it is preferably not more than 30 mN/m from the viewpoint of the wettability.

The jettable free radical radiation curable liquid preferably also contains at least one surfactant so that the dynamic surface tension is no more than 30 mN/m measured by maximum bubble pressure tensiometry at a surface age of 50 ms and at 25° C.

For having a good ejecting ability and fast inkjet printing, the viscosity of the jettable free radical radiation curable liquid at the temperature of 45° C. is preferably smaller than 30 mPa·s, more preferably smaller than 15 mPa·s, and most preferably between 1 and 10 mPa·s all at a shear rate of 30 s$^{-1}$. A preferred jetting temperature is between 10 and 70° C., more preferably between 25 and 50° C., and most preferably between 35 and 45° C.

The free radical radiation curable liquid may include monomers or oligomers which do not include an alkali hydrolyzable group. For rapid de-inking, the free radical radiation curable liquid includes preferably at least 15 wt %, more preferably at least 25 wt % of a monomer or oligomer including an alkali hydrolyzable group located in the atomic chain between two free radical polymerizable groups of the monomer or oligomer based on the total weight of the free radical radiation curable liquid;

In one preferred embodiment, the monomers and oligomers in the free radical radiation curable liquid consist essentially of monomers or oligomers including an alkali hydrolyzable group, preferably an alkali hydrolyzable group located in the atomic chain between two free radical polymerizable groups of the monomer or oligomer, and most preferably an alkali hydrolyzable oxalate group located in the atomic chain between two free radical polymerizable groups of the monomer or oligomer.

In a preferred embodiment, the monomer or oligomer including an alkali hydrolyzable group located in the atomic chain between two free radical polymerizable groups of the monomer or oligomer is a difunctional monomer or oligomer. More preferably, the one or more monomers or oligomers including an alkali hydrolyzable group located in the atomic chain between two free radical polymerizable groups of the monomer or oligomer present in the free radical radiation curable liquid consist of difunctional monomers or oligomers.

Monomers and Oligomers Including an Alkali Hydrolyzable Group

The alkali hydrolyzable group is preferably an oxalate group located in the atomic chain between two free radical polymerizable groups of the monomer or oligomer including an alkali hydrolyzable group.

In a preferred embodiment, the alkali hydrolyzable group forms an acid group or salt thereof upon hydrolyzation in a 2% NaOH solution at 85° C., preferably within 30 minutes, more preferably within 15 minutes, and most preferably within 8 minutes. This can be verified, for example, by titration at a temperature of 20° C. Alternatively, chemical analysis methods well-known to the skilled person can be performed such as e.g. GC-MS analysis, LC-MS analysis, H-NMR and C-NMR.

In a preferred embodiment of the free radical radiation curable liquid, the two free radical polymerizable groups are independently selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group and an allyl ester group.

In a more preferred embodiment of the free radical curable liquid, the monomer or oligomer including an alkali hydrolyzable group includes at least one free radical polymerizable group selected from the group consisting of an acrylate group, a methacrylate group and a vinyl ether group.

In an even more preferred embodiment of the free radical curable liquid, the free radical polymerizable groups of the monomer or oligomer including an alkali hydrolyzable group are all selected from the group consisting of an acrylate group, a methacrylate group and a vinyl ether group.

In a preferred embodiment of the free radical radiation curable liquid, the monomer or oligomer including an alkali hydrolyzable group is represented by Formula (I):

consisting of an acrylate group, a methacrylate group and a vinyl ether group, most preferably $A_1$ and $A_2$ are both an acrylate group.

In a more preferred embodiment of the monomer or oligomer including an alkali hydrolyzable group represented by Formula (I), $L_1$ and $L_2$ independently represent a linking group selected from the group consisting of a —$(CH_2)_n$— chain with n=2 to 10; a —$(CH_2—CH_2—O)_n$— chain with n=1 to 5 and a —$(CH_2—CH_2—CH_2—O)_n$— chain with n=1 to 3.

In a preferred embodiment of the free radical radiation curable liquid, the monomer or oligomer including an alkali hydrolyzable group is selected from the group consisting of:

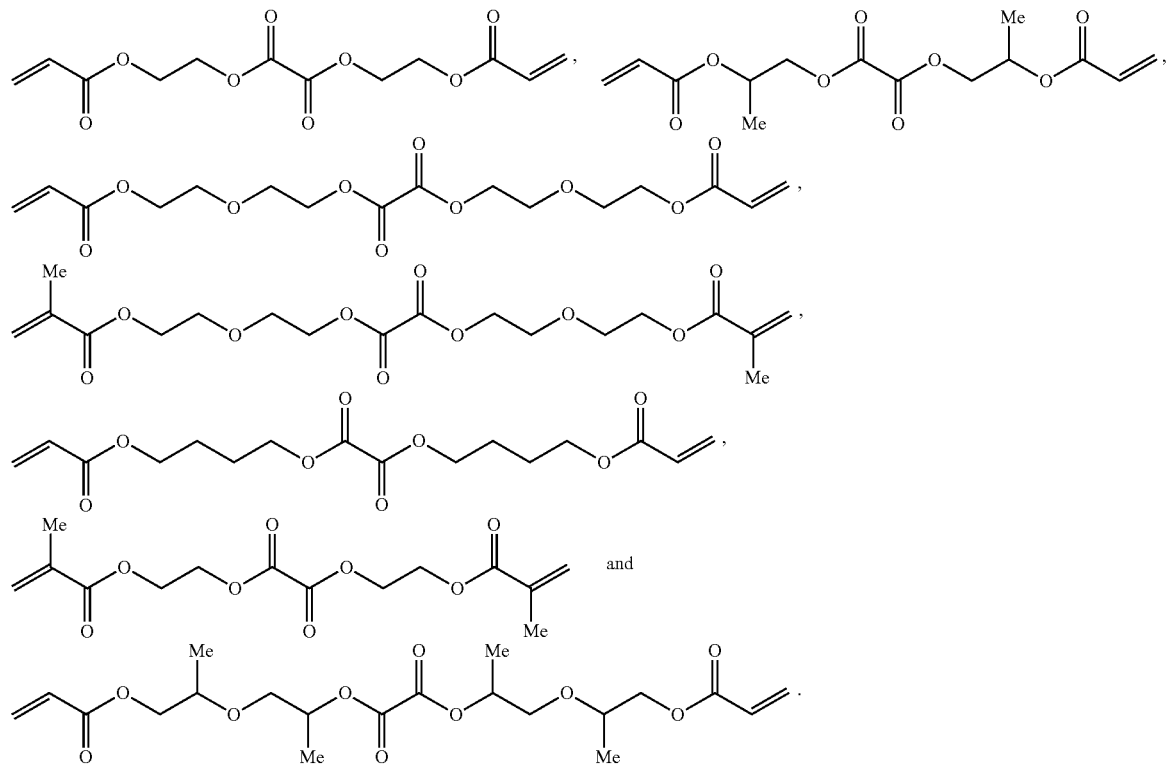

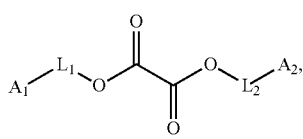

Formula (I)

wherein $A_1$ and $A_2$ are independently selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group and an allyl ester group;

$L_1$ and $L_2$ independently represent an linking group including 2 to 10 carbon atoms.

In a more preferred embodiment of the monomer or oligomer including an alkali hydrolyzable group represented by Formula (I), $A_1$ and $A_2$ are both selected from the group The free radical radiation curable liquid may also include a monomer or oligomer having an alkali hydrolyzable group as terminal group. These monomers and oligomers having no alkali hydrolyzable group located in the atomic chain between two free radical polymerizable groups, e.g. monofunctional monomers and oligomers, do not take part in the disintegration of the polymeric network but still have a contribution to the de-inking speed because of the formation of an ionic group enabling dispersion.

Preferred monomers and oligomers including an alkali hydrolyzable group as terminal group are selected from the group consisting of:

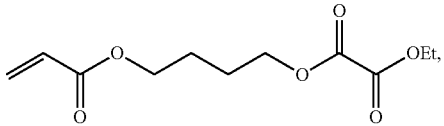

-continued

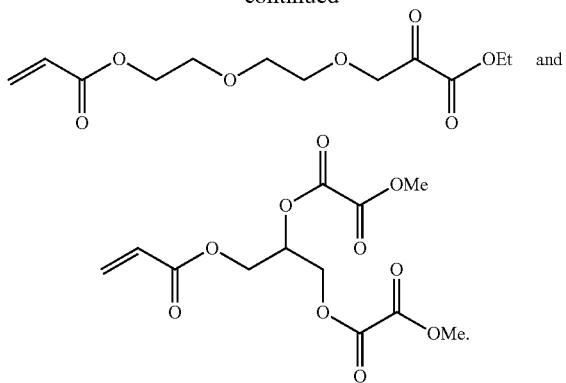

Other Monomers and Oligomers

Any monomer or oligomer capable of free radical polymerization may be used in addition to the monomer or oligomer including an alkali hydrolyzable group. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

The monomers and oligomers used, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Particularly preferred monomers and oligomers are those listed in [0106] to [0115] in EP 1911814 A (AGFA).

For achieving high printing speeds, low viscous monomers are used so that a low viscosity for the jettable free radical radiation curable liquid can be obtained. A popular low viscosity monomer is tetrahydrofurfuryl(meth)acrylate. However, in industrial inkjet printing also a high reliability is required which allows the incorporation of the inkjet printing system into a production line.

The radiation curable free radical curable liquid and/or inkjet ink preferably include a vinylether (meth)acrylate monomer. Vinylether acrylate monomers allow preparing radiation curable compositions of extremely low viscosity.

The vinylether (meth)acrylate monomer is preferably a monomer represented by Formula (II):

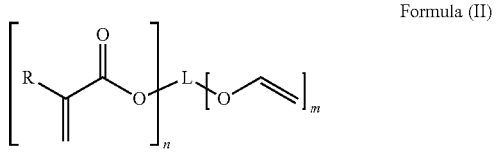

Formula (II)

wherein, R represents hydrogen or a methyl group;
L represents a linking group comprising at least one carbon atom; and
n and m independently represent a value from 1 to 5.

The radiation curable free radical curable liquid preferably includes 2-(2-vinyloxyethoxyl)ethyl acrylate as vinylether (meth)acrylate monomer.

In a preferred embodiment, the vinylether (meth)acrylate monomer is present in the free radical curable liquid in an amount of 20 wt % to 90 wt %, more preferably 25 wt % to 80 wt % and most preferably 30 wt % to 70 wt %, all based upon the total weight of the free radical curable liquid.

It was found that a vessel of tetrahydrofurfuryl acrylate kept at 40° C. for 100 hours lost 40% of its weight. Printing heads in the present method preferably operate at temperatures between 35 to 45° C. A high evaporation of tetrahydrofurfuryl(meth)acrylate from a print head nozzle during a stand-by mode from the inkjet printer leads to an unacceptable increase in viscosity of the inkjet ink in the print head and subsequently to jetting failures of the print head (bad latency). The free radical curable liquid and radiation curable inkjet inks preferably use low viscosity monomers exhibiting small evaporation rates such as vinyl ether(meth) acrylates. For example, 2-(2-vinyloxyethoxy)ethyl acrylate (VEEA) kept at 40° C. for 100 hours loses only 8% of its weight.

In a preferred embodiment, the monomers in the radiation curable inkjet ink which have a viscosity of less than 15 mPa·s at 45° C. and at a shear rate of 30 s$^{-1}$, lose less than 15% of their weight when kept at 40° C. for 100 hours in an open cubic vessel.

Another advantage of VEEA is that it is a bifunctional monomer having two different polymerizable groups, namely an acrylate group and an ether group. This allows a better control of the polymerization rate, whereby the amount of extractable and migrateable monomer is reduced. This reduces health risks to inkjet printer operators or allows for printing e.g. food packaging materials that are subject to strict safety regulations.

In a preferred embodiment, the radiation curable inkjet ink or free radical curable liquid includes a monomer or oligomer including at least one acrylate group and at least one ethylenically unsaturated polymerizable group selected from the group consisting of allylether group, allylester group, allylcarbonate group, vinyl ether group, vinylester group, vinylcarbonate group, fumarate group, and maleate group. Preferred examples of monomers and oligomers are disclosed in EP 2053101 A (AGFA).

The free radical radiation curable liquid preferably includes 60 to 95 wt % of polymerizable compounds, more preferably 70 to 90 wt % of polymerizable compounds based upon the total weight of the radiation curable inkjet ink. A varnish may include up to 99 wt % of polymerizable compounds based upon the total weight of the radiation curable varnish.

Photoinitiators

The free radiation curable liquid contains at least one photoinitiator, but may contain a photoinitiating system including a plurality of photoinitiators and/or co-initiators.

The photoinitiator in the free radical curable liquid is a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For a low migration radiation curable inkjet ink or free radical curable liquid, the photoinitiator is preferably a so-called diffusion hindered photoinitiator. A diffusion hindered photoinitiator is a photoinitiator which exhibits a much lower mobility in a cured layer of the ink or free radical curable liquid than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2161264 A (AGFA). A preferred amount of photoinitiator is 0-50 wt %, more preferably 0.1-20 wt %, and most preferably 0.3-15 wt % of the total weight of the radiation curable inkjet ink preferably also contains an initiator. The initiator typically initiates the polymerization reaction. The initiator can be a thermal initiator, but is preferably a photoinitiator. The photoinitiator requires less energy to activate than the monomers, oligomers and/or prepolymers to form a polymer.

The photoinitiator in the curable inkjet ink or free radical curable liquid is a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4, 6trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For a low migration free radical radiation curable liquid, the photoinitiator is preferably a so-called diffusion hindered photoinitiator. A diffusion hindered photoinitiator is a photoinitiator which exhibits a much lower mobility in a cured layer of the free radical curable liquid or ink than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2161264 A (AGFA). A preferred amount of photoinitiator is 0-50 wt %, more preferably 0.1-20 wt %, and most preferably 0.3-15 wt % of the total weight of the free radical radiation curable liquid.

In a very preferred embodiment, the free radical radiation curable liquid includes a polymerizable or polymeric thioxanthone photoinitiator and an acylphosphine oxide-based polymerization photoinitiator, more preferably a bis(2,4,6-trimethylbenzoyl)-phenylphosphineoxide photoinitiator.

Photoinitiators like bis(2,4,6-trimethylbenzoyl)-phenylphosphineoxide photoinitiator are monofunctional but are allowed by the Swiss ordinance SR 817.023.21 on Objects and Materials due to their very low toxicity level.

In order to increase the photosensitivity further, the free radical radiation curable liquid may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates.

When one or more co-initiators are included into the radiation curable inkjet ink or free radical curable liquid, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

The free radical radiation curable liquid preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 A (AGFA).

The free radical radiation curable liquid preferably includes the (diffusion hindered) co-initiator in an amount of 0.1 to 50 wt %, more preferably in an amount of 0.5 to 25 wt %, most preferably in an amount of 1 to 15 wt % of the total weight of the free radical radiation curable liquid.

Polymerization Inhibitors

The free radical curable liquid and (inkjet) inks may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total weight of the free radical curable liquid or (inkjet) ink.

Colorants

The colorant in the radiation curable (inkjet) ink can be a dye but is preferably a pigment. The pigmented radiation curable ink preferably contains a dispersant, more preferably a polymeric dispersant, for dispersing the pigment. The pigmented curable ink may contain a dispersion synergist to improve the dispersion quality and stability of the ink.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Preferred pigments are disclosed in paragraphs [0128] to [0138] of WO 2008/074548 (AGFA).

Particularly referred pigments include as red or magenta pigments, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, as blue or cyanogen pigments, Pigment Blue 1, 15, 15:1, 15:2, 15:3, 15:4, 15:6, 16, 17-1, 22, 27, 28, 29, 36, 60, as green pigments, Pigment Green 7, 26, 36, 50, as yellow pigments, Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, 193, as black pigments, Pigment Black 7, 28, 26, as white pigments, Pigment White 6, 18 and 21.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the radiation curable inkjet ink includes a black pigment and at least one pigment selected from the group consisting of a blue pigment, a cyan pigment, magenta pigment and a red pigment. It was found that such a black inkjet ink was better readable and scannable on a transparent substrate.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.200 μm. An average particle size smaller than 0.050 μm is less desirable for decreased fastness, but mainly also because very small pigment particles or individual pigment molecules thereof may still migrate into the food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA). The white pigment is preferably a pigment with a refractive index greater than 1.60. The white pigments may be employed singly or in combination. Preferably titanium dioxide is used as pigment with a refractive index greater than 1.60. Preferred titanium dioxide pigments are those disclosed in [0117] and in [0118] of WO 2008/074548 (AGFA).

The pigments are preferably present in the range of 0.01 to 15%, more preferably in the range of 0.05 to 10% by weight and most preferably in the range of 0.1 to 8% by weight, each based on the total weight of the pigment dispersion. For white pigment dispersions, the white pigment is preferably present in an amount of 3% to 40% by weight of the pigment dispersion, and more preferably 5% to 35%. An amount of less than 3% by weight cannot achieve sufficient covering power and usually exhibits very poor storage stability and ejection property.

Polymeric Dispersants

The pigmented radiation curable inkjet ink and pigmented free radical curable liquid preferably contains a dispersant, more preferably a polymeric dispersant, for dispersing the pigment. The pigmented radiation curable inkjet ink may contain a dispersion synergist to improve the dispersion quality and stability of the ink.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA).

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON. The polymeric dispersant is preferably used in an amount of 2 to 600 wt %, more preferably 5 to 200 wt %, most preferably 50 to 90 wt % based on the weight of the pigment.

Surfactants

The free radical curable liquids and radiation curable (inkjet) inks may contain at least one surfactant. The surfactant can be anionic, cationic, non-ionic, or zwitter-ionic and is usually added in a total quantity less than 3 wt % based on the total weight of the ink and particularly in a total less than 1 wt % based on the total weight of the free radical curable liquid or (inkjet) ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Preparation of Inkjet Inks

The preparation of pigmented radiation curable inkjet inks is well-known to the skilled person. Preferred methods of preparation are disclosed in paragraphs [0076] to [0085] of WO 2011/069943 (AGFA).

Inkjet Printing Methods

A method of inkjet printing in a preferred embodiment of the present invention includes the steps of: a) applying on a substrate a free radical radiation curable liquid containing a photoinitiator and a monomer or oligomer including an alkali hydrolyzable group; and b) curing the free radical radiation curable liquid; wherein the alkali hydrolyzable group is located in the atomic chain between two free radical polymerizable groups of the monomer or oligomer including an alkali hydrolyzable group.

In a preferred embodiment of the method of inkjet printing, the alkali hydrolyzable group is an oxalate group.

In a preferred embodiment, the method of inkjet printing further includes the step c) of de-inking the substrate using an alkaline liquid. The alkaline liquid is preferably an aqueous solution containing NaOH, KOH, $NH_4OH$ or the like.

The free radical curable liquid can be applied to the substrate by any suitable coating method, such as knife coating and curtain coating or by printing methods like inkjet, flexography or valve jet printing.

In a preferred embodiment, the free radical radiation curable liquid containing a photoinitiator and a monomer or oligomer including an alkali hydrolyzable group is applied on a substrate by inkjet printing.

If the free radical curable liquid is applied as a primer to the substrate, then free radical curable is preferably partially cured. By only partially curing, an improved adhesion between liquid and inkjet ink is observed compared to a fully cured liquid.

In a preferred embodiment, the method of inkjet printing is performed using an inkjet ink set including at least cyan, magenta, yellow and black inkjet inks.

Inkjet Printing Devices

The free radical radiation curable liquids may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to a preferred embodiment of the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The jettable free radical radiation curable liquids according to a preferred the present invention can be cured by exposing them to actinic radiation, preferably by ultraviolet radiation.

In inkjet printing, the curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head, such as LED. Therefore, a static fixed radiation source may be employed, e.g. a source of curing UV-light, connected to the radiation source by a flexible radiation conductive device such as a fiber optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Substrates

There is no real limitation on the type of substrate. The substrates may have ceramic, metallic or polymeric surfaces for printing.

The substrate may be porous, as e.g. textile, paper and card board substrates, or substantially non-absorbing substrates such as e.g. a substrate having a polyethyleneterephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

There is no restriction on the shape of the substrate. It can be a flat sheet, such a paper sheet or a polymeric film or it can be a three dimensional object like e.g. a plastic coffee cup. If foodstuffs or pharmaceuticals are to be included as content of the three dimensional object, than preferably diffusion hindered photoinitiators and purified monomers and oligomers are used. In a preferred embodiment, the one or more free radical curable inkjet inks include a polymeric or polymerizable photoinitiator.

The three dimensional object can also be a container like a bottle or a jerry-can for including e.g. oil, shampoo, insecticides, pesticides, solvents, paint thinner or other type of liquids.

The free radical radiation curable liquid can also be advantageously used in etch resist technology.

In one preferred embodiment, the inkjet printing method of the present invention is used in a method for manufacturing a conductive pattern, such as a PCB. A problem observed when using inkjet etch resists having a classic radiation curable formulation lacking a monomer or oligomer including an alkali hydrolyzable group located in the atomic chain between two free radical polymerizable groups of the monomer or oligomer is that after etching, the stripping of the etch resist layer results in the formation of large flakes. These large flakes cause problems in the equipment handling and transport of the PCB plates. By using a free radical radiation curable liquid according to preferred embodiments of the present invention, stripping resulted in small flakes or even a completely dissolved etch resist causing no problems of equipment contamination and retransfer of flakes to the PCB's.

In another preferred embodiment, the inkjet printing method of the present invention is used in a method for manufacturing a decorative etched metal panel. In this case, usually not all the metal is removed from the metal surface. The metal panel may consist of metal or can be some kind of support with a metallic surface. In the latter, metal may be removed to reveal the color and texture of the support. Etching causes a change in optical properties of a metal surface, such as a change of gloss.

EXAMPLES

Materials

All materials used in the examples were readily available from standard sources such as Sigma-Aldrich (Belgium) and Acros (Belgium) unless otherwise specified.

Macrolex™ Blue 3R is a blue anthraquinone dye from LANXESS.

Heliogen™ Blue D 7110 F is a C.I. Pigment Blue 15:4 pigment from CIBA-GEIGY.

ITX is an isomeric mixture of 2- and 4-isopropylthioxanthone available as Darocur™ ITX from BASF. $IC_{907}$ is 2-methyl-1-[4-(methylthio)phenyl]-2-morpholino-propan-1-one, a photoinitiator available as Irgacure™ 907 from BASF. $IC_{819}$ is bis(2,4,6-trimethylbenzoyl)-phenylphosphineoxide, a photoinitiator available as Irgacure™ 819 from BASF. TPO is 2,4,6-trimethylbenzoyl-diphenyl-phosphineoxide, a photoinitiator available as Darocur™ TPO from BASF.

Stabi-1 is a mixture forming a polymerization inhibitor having a composition according to Table 1:

TABLE 1

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminium N-nitrosophenylhydroxylamine from WAKO CHEMICALS LTD.

2-(2-vinyloxy-ethoxy)-ethyl acrylate (VEEA) and 2-(2-vinyloxy-ethoxy)-ethyl methacrylate (VEEM) were supplied by Nippon Shokubai.

4-hydroxybutyl acrylate was supplied by Nippon Kasei. PEA is 2-phenoxyethyl acrylate available as Sartomer™ SR339C from SARTOMER.

M170 is 2-(2-ethoxyl)ethyl acrylate (CASRN 7328-17-8) available as Miramer™ 170 from RAHN AG.

PEG200DA is polyethylene glycol (MW200) diacrylate available as Sartomer™ SR259 from SARTOMER having n=4:

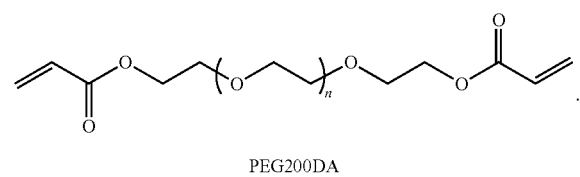

PEG200DA

HDDA is 1,6-hexanediol diacrylate available as Sartomer™ SR238 from SARTOMER:

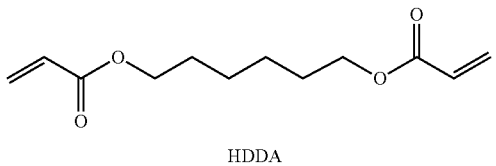

HDDA

EFKA™7701 is a butylacrylate-vinylpyridine copolymer having an amine value of 40 mg KOH/g available from BASF.

DISP-1 is a cyan pigment dispersion prepared as follows: 900 g of EFKA™7701, 900 g of Heliogen™ Blue D 7110 F and 60 g of Stabi-1 were mixed into in 4,340 g of PEA using a DISPERLUX™ dispenser. Stirring was continued for 30 minutes. The vessel was connected to a DYNO™-MILL ECM Poly mill from the company Willy A. Bachofen (Switzerland) filled for 42% with 0.4 mm yttrium stabilized zirconia beads ("high wear resistant zirconia grinding media" from TOSOH Co.). The mixture was circulated over the mill for a residence time of 20 minutes at a flow rate of 1.5 l/min and a rotation speed in the mill of about 13 m/s. During the complete milling procedure the content in the mill was cooled to keep the temperature below 40° C. After milling, the dispersion was discharged into a 15 L-vessel. The resulting concentrated pigment dispersion DISP-1 according to Table 2 exhibited an average particle size of 109 nm and a viscosity of 241 mPa·s.

TABLE 2

| Component | wt % |
|---|---|
| Heliogen ™ Blue D 7110 F | 15.0 |
| EFKA ™ 7701 | 15.0 |
| Stabi-1 | 1.0 |
| PEA | 69.0 |

PET175 is a 175 μm thick unsubbed polyethylene terephthalate sheet available as Astera™ type U175.332 from AGFA-GEVAERT NV.

Isola™ 400 is a Cu-plate available from CCI Eurolam having a metal surface consisting of an 18μ Cu-laminate.

Measurement Methods

1. GC Analysis

The GC analysis was done on an Agilent 6890, using a DB1 column (30×0.25 0.25), helium as carrier gas at a flow rate of 2 ml/min and a split ratio of 50 to 1. A temperature profile was used, starting at 40° C. for 2 minutes and a temperature increase of 15° C. per minute up to a temperature of 200° C. 1 μl of a 1 w/w % solution of each compound in methylene chloride was injected.

2. GC-MS Analysis

The GC-MS analysis was done on a Trace Ultra-DSQ, using a DB-xlb column (30×0.25 0.25), helium as carrier gas at a flow rate of 1.2 ml/min and a split ratio of 50 to 1. A temperature profile was used starting at 80° C. and a temperature increase of 15° C. per minute up to 325° C. EI an $PCI_{(ammonia)}$ was used for recording the mass spectra. 1 μl of a 1 w/w % solution of each compound in methylene chloride was injected.

3. LC-MS Analysis

The LC-MS analysis was done on a Bruker HG Ultra, using an Altima HP $C_{18}$ AQ column (150×3, 5 μm), operating at a flow rate of 0.35 ml/min and at 40° C. A gradient elution was used, with water as eluent A and acetonitrile as eluent B. The gradient according to Table 3 was used.

TABLE 3

| Time | % B |
|------|-----|
| 0 | 45 |
| 6 | 45 |
| 11 | 100 |
| 30 | 100 |
| 31 | 45 |
| 38 | 45 |

ESI ionisation was used in combination with a combibron detector. 5 μl of a solution of 2 mg of each compound in 20 ml acetonitrile was injected.

4. Flow Injection-MS:

The flow injection analysis was done on a Bruker HG Ultra, using a mixture of 95% acetonitrile and 5% of 2 mmol ammonium acetate solution in water as eluent at a flow rate of 0.1 ml/min and a temperature of 40° C. ESI negative was used as ionisation. 2 μl of a solution of 2 mg of each compound in 20 ml acetonitrile was injected.

5. De-inking

The de-inking property was tested by submerging the colored coated sample in a 2% NaOH aqueous solution at 20° C. and visually evaluating if the colored ink layer detached from the PET substrate and if it dissolved.

6. Solvent Resistance

The solvent resistance was tested by submerging the colored coated sample in various solvents. If after 24 h no discoloration of the solvent or no detachment or degradation of the ink layer took place, the solvent resistance was evaluated as OK.

7. Adhesion

The adhesion was tested A 5 cm long strip of a Tesatape™ 4104 PVC tape was pressed on to the printed inkjet ink. The tape was pressed four times with the thumb before removing it in one sharp pull. The adhesion was then evaluated in accordance with the evaluation values described in Table A.

TABLE A

| Evaluation value | Observation |
|---|---|
| 0 | Nothing removed, perfect adhesion. |
| 1 | Detachment of only very small parts of the inkjet ink coating, almost perfect adhesion. |
| 2 | Minor parts of the inkjet ink coating was removed by the tape, good adhesion |
| 3 | Large parts of the inkjet ink coating was removed by the tape, poor adhesion. |
| 4 | Most of the inkjet ink coating was removed by the tape, very poor adhesion. |
| 5 | The inkjet ink was completely removed from the substrate by the tape, no adhesion. |

8. Etch Resistance

The etch resistance was evaluated by the determining the percentage of the cured inkjet ink layer that remained on the copper plate after etching. An etch resistance of 100% means that the whole cured inkjet ink layer survived the etching bath. An etch resistance of 0% means that no cured inkjet ink could be found to be present on the copper plate after etching. An intermediate percentage, e.g. 80% means that about 80% of the cured inkjet ink could be found to be present on the copper plate after etching. A good etch resistance means a value of at least 80%. Excellent etch resistance means a value of at least 90% but preferably 100%.

9. Strippability

The strippability was evaluated by the determining the percentage of the cured inkjet ink layer that was removed from the copper plate after stripping. A strippability of 100% means that the whole cured inkjet ink layer was removed. A strippability of 0% means that no cured inkjet ink could be removed from the copper plate. An intermediate percentage, e.g. 30% means that only about 30% of the cured inkjet ink could be removed from the copper plate by stripping. A good strippability means a value of at least 80%. Excellent strippability means a value of at least 90% but preferably 100%. A value of 30% or less is a very poor strippability.

Example 1

This example illustrates the synthesis of monomers and oligomers including an alkali hydrolyzable group located in the atomic chain between two free radical polymerizable groups of the monomer or oligomer including an alkali hydrolyzable group.

Synthesis of oxalic acid bis-[2-(2-acryloyloxy-ethoxy)-ethyl]ester:

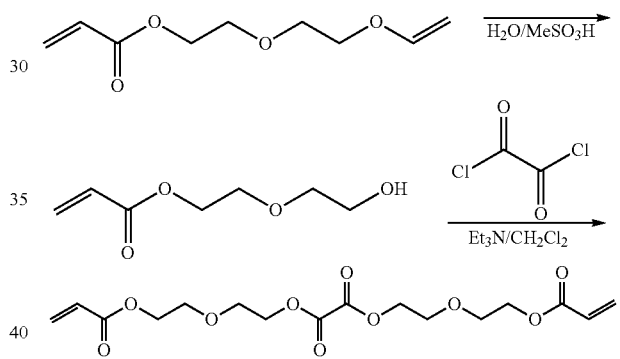

First Step: Synthesis of 2-(2-hydroxy-ethoxy)-ethyl acrylate 55.9 g (0.3 mol) 2-(2-vinyloxy-ethoxy)-ethyl acrylate was dissolved in 100 ml acetone. 27 g (1.5 mol) water and 0.6 g (6 mmol) methane sulfonic acid was added. The reaction was allowed to continue for 4 hours at room temperature. The reaction mixture was diluted with 500 ml methylene chloride and extracted with 250 ml water. The organic fraction was dried over MgSO$_4$ and evaporated under reduced pressure. 2-(2-hydroxy-ethoxy)-ethyl acrylate was analyzed using TLC-chromatography (Partisil KC18F, supplied by Whatman, eluent: methanol/0.5 N NaCl 80/20, $R_f$: 0.83, only traces of (2-vinyloxy-ethoxy)-ethyl acrylate, $R_f$: 0.66 and a compound according to the following structure, $R_f$: 0.9).

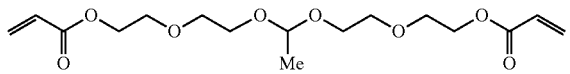 [SMILES: C=CC(=O)OCCOCCOC(C)OCCOCCOC(=O)C=C]

2-(2-hydroxy-ethoxy)-ethyl acrylate was used without further purification.

Second Step: Synthesis of oxalic acid bis-[2-(2-acryloyloxy-ethoxy)-ethyl]ester 30.4 g (0.19 mol) of 2-(2-hydroxy-ethoxy)-ethyl acrylate, 19.8 g (0.196 mol) triethyl amine and 1.3 g (5.7 mmol) BHT were dissolved in 140 ml methylene chloride. The solution was cooled to −10° C. A solution of 12.1 g (0.095 mol) oxalyl chloride in 70 ml methylene chloride was added drop wise, while maintaining the temperature at −10° C. The reaction was allowed to continue for 1 hour at 0° C., followed by reaction at room temperature for 16 hours. The reaction mixture was added to 200 g ice and the mixture was extracted with 200 ml methylene chloride. The organic fraction was extracted with 200 ml of a 1N hydrochloric acid solution, 200 ml of a saturated NaHCO$_3$ solution and 200 ml of brine. The organic fraction was dried over MgSO$_4$ and evaporated under reduced pressure. The crude product was purified, using preparative column chromatography using a Prochrom LC80 column, packed with packed with Kromasil Si 60 å 10 μm and methylene chloride/ethyl acetate 90/10 as eluent. 19.1 g of oxalic acid bis-[2-(2-acryloyloxy-ethoxy)-ethyl]ester was isolated (y: 54%). The compound was analyzed using TLC-chromatography (TLC Silica gel 60 F$_{254}$, supplied by Merck, eluent:methylene chloride/ethyl acetate, 83/17, R$_f$: 0.42) and LC-MS, according to the method described above (retention time: 6.6 min, purity 96.2 area %).

Synthesis of oxalic acid bis-(4-acryloyloxy-butyl)ester

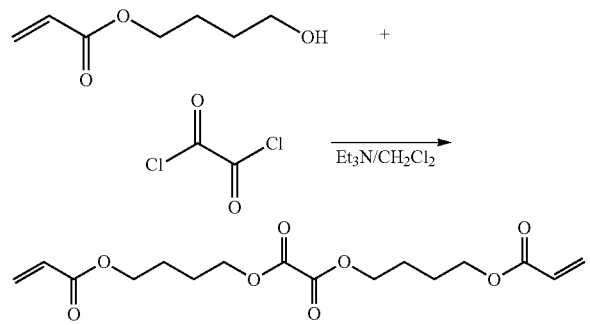

51.3 g (0.3 mol) 4-hydroxy-butyl acrylate, 31.4 g (0.31 mol) triethyl amine and 2 g (9 mmol) BHT were dissolved in 200 ml methylene chloride. The reaction mixture was cooled to −10° C. A solution of 19.0 g (0.15 mol) oxalyl chloride in 100 ml methylene chloride was added drop wise while maintaining the temperature at −10° C. The reaction was allowed to continue for 1 hour at 0° C., followed by reaction at room temperature for 16 hours. The reaction mixture was poured into 500 g ice and the mixture stirred for 1 hour. The mixture was extracted twice with 200 ml methylene chloride. The pooled organic fractions were extracted with 300 ml of a 1 N hydrochloric acid solution, 300 ml of a saturated NaHCO$_3$ solution and twice with 200 ml of brine. The organic fraction was dried over MgSO$_4$ and evaporated under reduced pressure. The crude product was purified, using preparative column chromatography using a Prochrom LC80 column, packed with packed with Kromasil Si 60 å 10 μm and methylene chloride/ethyl acetate 90/10 as eluent. 22 g of oxalic acid bis-(4-acryloyloxy-butyl)ester was isolated (y: 43%). The compound was analyzed, using TLC chromatography (TLC Silica gel 60 F$_{254}$, supplied by Merck, eluent: methylene chloride/ethyl acetate 96/4, R$_f$: 0.3), GC (retention time: 12.2 min, purity: 99.6 area %), and GC-MS, both according to the method described above.

Synthesis of 4-acryloyloxybutyl-ethyl oxalate

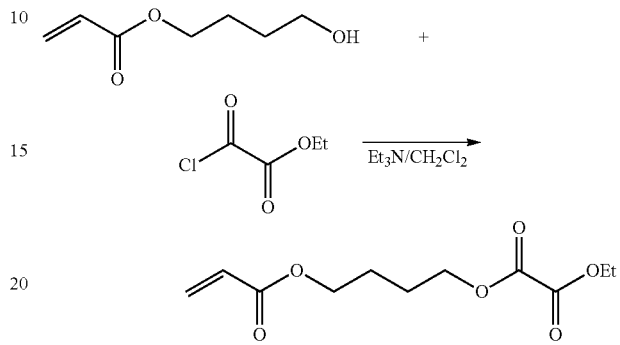

14.4 g (0.1 mol) 4-hydroxy-butyl acrylate, 11.1 g (0.11 mol) triethyl amine and 0.7 g (3 mmol) BHT were dissolved in 100 ml methylene chloride. The reaction mixture was cooled to −10° C. 15.0 g (0.11 mol) ethyl oxalyl chloride was added drop wise, while maintaining the temperature at −10° C. The reaction was allowed to continue for 30 minutes at 0° C., followed by reaction at room temperature for 16 hours. The reaction mixture was poured into a mixture of 150 g ice and 150 g water and stirred for 1 hour. The mixture was extracted with 200 ml methylene chloride. The organic fraction was washed with 100 ml of a 1 N hydrochloric acid solution, 100 ml of a saturated NaHCO$_3$ solution and twice with 100 ml of brine. The organic fraction was dried over MgSO$_4$ and evaporated under reduced pressure. 24 g of 4-acryloyloxy-butyl-ethyl oxalate was isolated (y: 98%). The compound was analysed using TLC analysis (TLC Silica gel 60 F$_{254}$, supplied by Merck, eluent: methylene chloride/ethyl acetate 96/4, R$_f$: 0.62), GC (retention time: 10 min, purity: 91.6 area %, main contaminant BHT, 5.1 area %) and GC-MS according to the method described above. The compound was sufficiently pure for evaluation.

Synthesis of oxalic acid bis-[2-(2-methacryloyloxy-ethoxy)-ethyl]ester

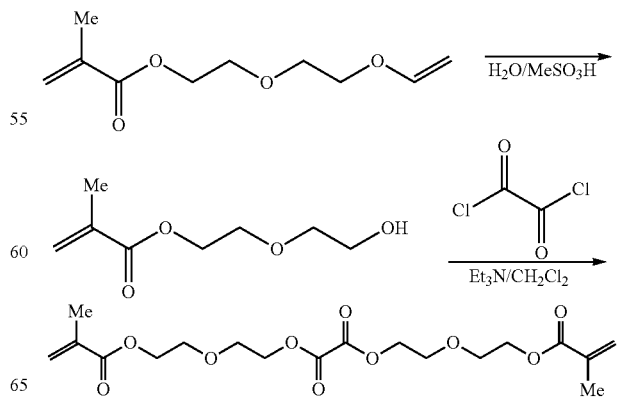

First Step: Synthesis of 2-(2-hydroxy-ethoxy)-ethyl methacrylate 24 g (0.12 mol) (2-vinyloxy-ethoxy-ethyl) methacrylate was dissolved in 40 ml acetone. 10.8 g (0.6 mol) water and 0.2 g (2.4 mmol) methane sulfonic acid were added. The reaction was allowed to continue for 4 hours at room temperature. The reaction mixture was diluted with 200 ml methylene chloride and extracted with 100 ml water. The organic fraction was dried over $MgSO_4$ and evaporated under reduced pressure. 18.3 g of 2-(2-hydroxy-ethoxy)-ethyl methacrylate was isolated (y: 87.6%). The compound was analyzed using TLC chromatography (TLC Silica gel 60 $F_{254}$, supplied by Merck, eluent: methylene chloride/ethyl acetate 90/10, $R_f$: 0.15). 2-(2-hydroxy-ethoxy)-ethyl methacrylate was used without further purification.

Second Step: Synthesis of oxalic acid bis-[2-(2-methacryloyloxy-ethoxy)-ethyl]ester 15.7 g (0.09 mol) of 2-(2-hydroxy-ethoxy)-ethyl methacrylate, 9.4 g (0.093 mol) triethyl amine and 0.6 g (2.7 mmol) BHT were dissolved in 65 ml methylene chloride. The reaction mixture was cooled to −10° C. A solution of 5.7 g (0.045 mol) oxalyl chloride in 32 ml methylene chloride was added drop wise while maintaining the temperature at −10° C. The reaction was allowed to continue at 0° C. for 30 minutes, followed by reaction at room temperature for 16 hours. The reaction mixture was poured into a mixture of 150 g ice and 150 g water and stirred for 1 hour. The mixture was extracted with 200 ml methylene chloride and the organic fraction was extracted with 100 ml of a 1 N hydrochloric acid solution, 100 ml of a saturated $NaHCO_3$ solution and twice with 100 ml of brine. The organic fraction was dried over $MgSO_4$ and evaporated under reduced pressure. The crude oxalic acid bis-[2-(2-methacryloyloxy-ethoxy)-ethyl]ester was purified by preparative column chromatography, using a GraceResolv $SiO_2$ 47 μm 73 å column, using a gradient elution from methylene chloride to methylene chloride/ethyl acetate 90/10. 5.45 g of oxalic acid bis-[2-(2-methacryloyloxy-ethoxy)-ethyl]ester was isolated (y: 30%). The compound was analyzed by TLC analysis (TLC Silica gel 60 $F_{254}$, supplied by Merck, eluent: methylene chloride/ethyl acetate 83/17, $R_f$: 0.42).

Synthesis of oxalic acid bis-(2-methacryloyloxyethyl)-ester

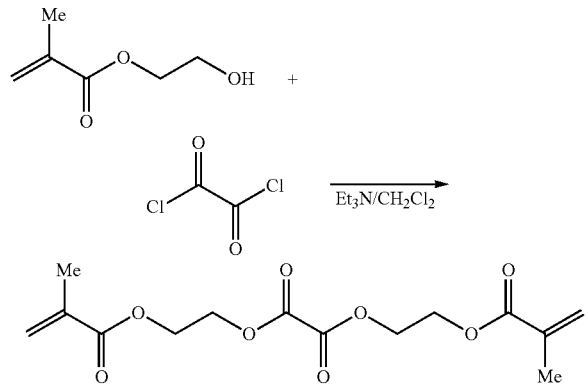

16.9 g (0.13 mol) 2-hydroxyethyl methacrylate, 13.5 g (0.134 mol) triethyl amine and 0.9 g (3.9 mmol) BHT were dissolved in 65 ml methylene chloride. The reaction mixture was cooled to −10° C. A solution of 8.3 g (0.065 mol) oxalyl chloride in 35 ml methylene chloride was added drop wise while maintaining the temperature at −10° C. The reaction was allowed to continue for 1 hour at 0° C. followed by reaction at room temperature for 3 hours. The reaction mixture was poured into 200 g ice and stirred for 1 hour. The organic fraction was isolated and the aqueous fraction was extracted with 200 ml methylene chloride. The pooled organic fractions were extracted with 100 ml of a 1 N hydrochloric acid solution, 100 ml of a saturated $NaHCO_3$ solution and twice with 100 ml of brine. The organic fraction was dried over $MgSO_4$ and evaporated under reduced pressure. Oxalic acid bis-(2-methacryloyloxyethyl)-ester was crystallized from methyl-t.butyl-ether/hexane, isolated by filtration and dried. 10.9 g oxalic acid bis-(2-methacryloyloxyethyl)-ester was isolated (y: 53%). The compound was analyzed by TLC-analysis (TLC Silica gel 60 $F_{254}$, supplied by Merck, eluent: methylene chloride/ethyl acetate 90/10, $R_f$: 0.61).

Synthesis of oxalic acid bis-(2-acryloyloxy-ethyl)ester

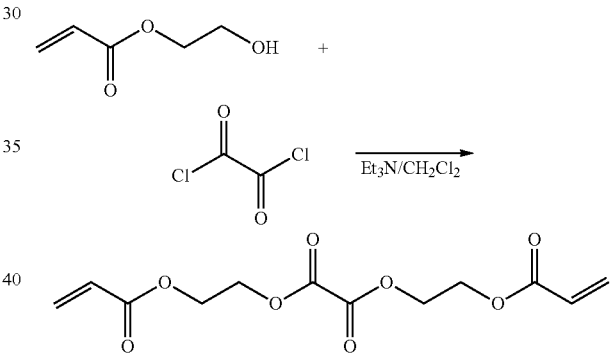

34.8 g (0.3 mol) 2-hydroxyethyl acrylate, 31.4 g (0.31 mol) triethyl amine and 2 g (9 mmol) BHT were dissolved in 200 ml methylene chloride. The reaction mixture was cooled to −10° C. A solution of 19.0 g (0.15 mol) oxalyl chloride in 100 ml methylene chloride was added drop wise, while maintaining the temperature at −10° C. The reaction was allowed to continue at 0° C. for 1 hour, followed by reaction at room temperature for 16 hours. The reaction mixture was poured into 500 g ice and stirred for 1 hour. The mixture was extracted 3 times with 200 ml methylene chloride. The pooled organic fractions were extracted with 300 ml of a 1 N hydrochloric acid solution, 300 ml of a saturated $NaHCO_3$ solution and twice with 300 ml of brine. The organic fraction was dried over $MgSO_4$ and evaporated under reduced pressure. Oxalic acid bis-(2-acryloyloxyethyl)ester was crystallized from methylene chloride/hexane, isolated by filtration and dried. 31.2 g of oxalic acid bis-(2-acryloyloxy-ethyl)ester was isolated (y: 73%). The compound was analyzed by TLC-analysis (TLC Silica gel 60 $F_{254}$, supplied by Merck, eluent: methylene chloride/ethyl acetate 90/10, $R_f$: 0.35) and by flow injection MS according to the method described above.

Synthesis of oxalic acid bis-(acryloyloxy-propyl)ester (mixture of isomers)

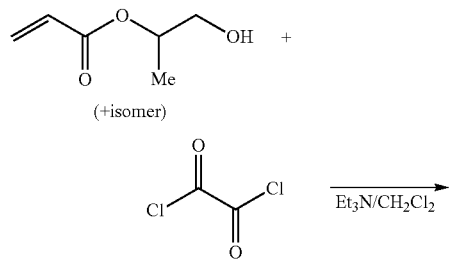

(+isomer)

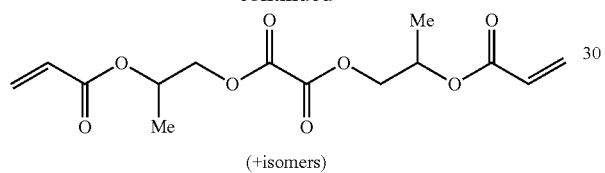

(+isomers)

39.0 g (0.3 mol) hydroxypropyl acrylate (mixture of isomers), 31.4 g (0.31 mol) triethyl amine and 2.0 g (9 mmol) BHT were dissolved in 200 ml methylene chloride. The reaction mixture was cooled to −10° C. A solution of 19.0 g (0.15 mol) oxalyl chloride in 100 ml methylene chloride was added drop wise while maintaining the temperature at −10° C. The reaction was allowed to continue for 1 hour at 0° C., followed by reaction for 16 hours at room temperature. The reaction mixture is poured into 500 g ice and the mixture is stirred for 1 hour. The mixture was extracted 3 times with 300 ml methylene chloride. The pooled organic fractions were extracted with 300 ml of a 1 N hydrochloric acid solution, 300 ml of a saturated NaHCO$_3$ solution and twice with 300 ml of brine. The organic fraction was dried over MgSO$_4$ and evaporated under reduced pressure. Oxalic acid bis-(acryloyloxy-propyl)ester was purified by preparative column chromatography, using a Prochrom LC80 column, packed with Kromasil Si 60 å 10 μm and methylene chloride/ethyl acetate 90/10 as eluent. 25.9 g oxalic acid bis-(acryloyloxy-propyl)ester was isolated as mixture of isomers (y: 55%). The compound was analyzed, using TLC-analysis (TLC Silica gel 60 F$_{254}$, supplied by Merck, eluent: methylene chloride/ethyl acetate 96/4, R$_f$: 0.38), GC (retention time: 9.6 min, purity: 99.8 area %) and GC-MS, both according to the method described above.

Example 2

This example illustrates the advantage in de-inking of free radical radiation curable liquids according to the present invention Preparation of Free Radical Curable Liquids The comparative free radical curable liquids COMP-1 to COMP-4 and the inventive free radical curable liquids INV-1 to INV-4 were prepared according to Table 4 and Table 5. The weight percentage (wt %) was based on the total weight of the free radical curable liquids.

The oxalate monomers OXAL-1 and OXAL-2 exhibit a high structural similarity to the monomers PEG200DA and HDDA respectively.

OXAL-1 is an oxalate monomer similar to PEG200DA:

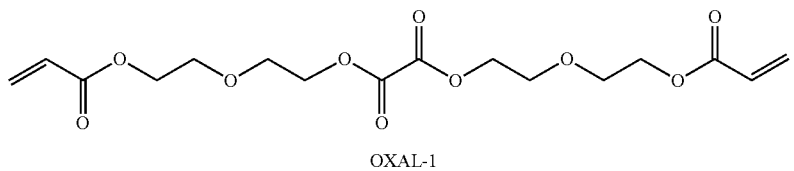

OXAL-1

OXAL-2 is an oxalate monomer similar to HDDA:

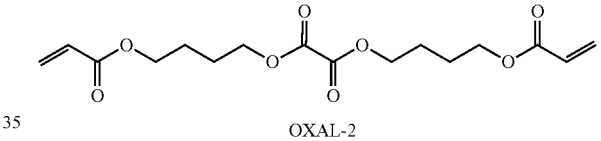

OXAL-2

OXAL-3 is a monofunctional monomer having a terminal oxalate group and having a high similarity to the monomer M170:

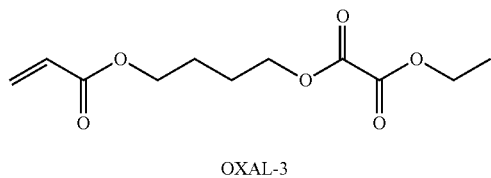

OXAL-3

TABLE 4

| wt % of: | COMP-1 | COMP-2 | COMP-3 | COMP-4 |
|---|---|---|---|---|
| DISP-1 | 16 | 16 | 16 | 16 |
| ITX | 5 | 5 | 5 | 5 |
| IC907 | 5 | 5 | 5 | 5 |
| IC819 | 3 | 3 | 3 | 3 |
| TPO | 2 | 2 | 2 | 2 |
| Stabi-1 | 1 | 1 | 1 | 1 |
| PEG200DA | 43 | — | — | 43 |
| HDDA | 25 | 43 | 43 | — |
| OXAL-1 | — | — | — | — |
| OXAL-2 | — | — | — | — |
| OXAL-3 | — | 25 | — | — |
| M170 | — | — | 25 | 25 |

TABLE 5

| wt % of: | INV-1 | INV-2 | INV-3 | INV-4 |
|---|---|---|---|---|
| DISP-1 | 16 | 16 | 16 | 16 |
| ITX | 5 | 5 | 5 | 5 |
| IC907 | 5 | 5 | 5 | 5 |
| IC819 | 3 | 3 | 3 | 3 |
| TPO | 2 | 2 | 2 | 2 |
| Stabi-1 | 1 | 1 | 1 | 1 |
| PEG200DA | — | — | — | — |
| HDDA | — | — | — | — |
| OXAL-1 | 43 | — | — | 43 |
| OXAL-2 | 25 | 43 | 43 | — |
| OXAL-3 | — | 25 | — | — |
| M170 | — | — | 25 | 25 |

Evaluation and Results

The free radical curable liquids COMP-1 to COMP43 and INV-1 to INV-4 were coated on a PET175 substrate using a bar coater and a 10 μm wired bar. All coated samples were cured using a Fusion DRSE-120 conveyer, equipped with a Fusion VPS/1600 lamp (D-bulb). The samples were cured using a belt speed of 20 m/min and at full power of the lamp. Each sample was passed twice under the lamp.

The coated samples were tested for de-inking, solvent resistance and adhesion. The results are shown in Table 6.

TABLE 6

| Test | COMP-1 | COMP-2 | COMP-3 | COMP-4 | INV-1 | INV-2 | INV-3 | INV-4 |
|---|---|---|---|---|---|---|---|---|
| De-inking | | | | | | | | |
| fully detached after | Not | Not | Not | Not | 10 min | 180 min | 80 min | 80 min |
| dissolved after 24 h | No | No | No | No | Yes | No | Yes | Yes |
| Solvent resistance | | | | | | | | |
| water | Not OK | OK | OK | OK | OK | OK | OK | OK |
| isopropanol | OK | OK | OK | OK | OK | OK | OK | OK |
| ethanol | Not OK | OK | OK | OK | OK | OK | OK | OK |
| Adhesion | 0 | 0 | 5 | 5 | 5 | 0 | 5 | 0 |

From Table 6, it can be seen that none of the free radiation curable liquids COMP-1 to COMP-4 allowed a detachment or dissolution of the ink layer. COMP-2 shows that it is not sufficient to include a monomer with a terminal alkali hydrolyzable group (OXAL-3). The differences in speed of detachment/dissolution of the ink layer and adhesion can be explained by the hydrophilicity and the amount of monomer including an alkali hydrolyzable group located in the atomic chain between two free radical polymerizable groups of the monomer. This hydrophilicity and the amount can thus be used to influence the speed of detachment or dissolution and the adhesion of the ink layer depending on the type of substrate used.

Example 3

This example illustrates the advantage of a free radical radiation curable liquid for inkjet etch resist technology.
Preparation of Free Radical Curable Inkjet Inks The comparative free radical curable inkjet ink COMP-5 and the inventive free radical curable inkjet ink INV-5 were prepared according to Table 7. The weight percentage (wt %) was based on the total weight of the free radical curable inkjet inks. The oxalate monomers in the inventive free radical curable inkjet ink INV-5 exhibit a high structural similarity to the monomers used in the comparative free radical curable inkjet ink COMP-5.

TABLE 7

| wt % of component: | COMP-5 | INV-5 |
|---|---|---|
| Macrolex ™ Blue 3R | 1.75 | 1.75 |
| ITX | 5.00 | 5.00 |
| IC907 | 5.00 | 5.00 |
| IC819 | 3.00 | 3.00 |
| TPO | 2.00 | 2.00 |
| Stabi-1 | 1.00 | 1.00 |
| PEG200DA | 52.25 | — |
| HDDA | 30.00 | — |
| OXAL-1 | — | 52.25 |
| OXAL-2 | — | 30.0 |

Evaluation and Results

Isola™ 400 copper plates were cleaned for 5 seconds at 25° C. with a solution called Mecbrite™ CA-95 from MEC Europe, which has pH<1 and contained $H_2SO_4$, $H_2O_2$ and $Cu^{2+}$. During this operation a thin top layer of Cu (0.3-0.5 μm) was removed. The plates were then rinsed with a water jet for 90 seconds.

A pattern of the radiation curable inkjet inks COMP-5 and INV-5 were coated at a thickness of 10 μm on the copper plate and cured by a Fusion DRSE-120 conveyer, equipped with a Fusion VPS/1600 lamp (D-bulb), which transported the samples under the UV-lamp on a conveyer belt at a speed of 20 m/min. The maximum output of the lamp was 1.05 $J/cm^2$ and a peak intensity of 5.6 $W/cm^2$. All inkjet inks were fully cured.

The plates were subjected to an acidic etch bath ("Mega" acid etchant obtained from Mega Electronics, pH 2, contains $FeCl_3$) for 60 seconds at 35° C. The plates were subsequently rinsed for 90 seconds with water and dried. An evaluation of the etch resistance was then made as shown in Table 8.

The etched copper plates were subjected for 5 minutes at 50° C. to an alkaline strip bath (containing 10% Ristoff C-71 from Centurion Speciality Chemicals Ltd and 7% ethanolamine, pH 13), then rinsed for 90 seconds with water, dried, and evaluated for strippability and the shape of the stripped ink layer. Stirring was continued for another 5 minutes and the shape of stripped ink layer was re-evaluated. The results are shown in Table 8.

TABLE 8

| | Free radical curable inkjet ink | |
|---|---|---|
| Result of | COMP-5 | INV-5 |
| Etch Resistance | 100% | 100% |
| Strippability | 100% | 100% |

TABLE 8-continued

| | Free radical curable inkjet ink | |
|---|---|---|
| Result of | COMP-5 | INV-5 |
| Shape of stripped ink layer | | |
| after 5 min stirring | large flakes | small flakes |
| after 10 min stirring | large flakes | flakes became thinner and dissolved fully |

From Table 8, it should be clear that the free radical curable inkjet ink INV-5 provided results for etch resistance and strippability that are comparable to those of the comparative free radical curable inkjet ink COMP-5, with the exception that smaller flakes and finally fully dissolved flakes were obtained after 10 minutes in the alkaline stripping bath. The advantage of such small or dissolved flakes of etch resist layer is that they cause no retransfer of flakes to the copper plate, thus the copper plates can simply be cleaned by rinsing with water. In addition problems of clogging in filters, pumps and pipes in the etching apparatus were eliminated.

The invention claimed is:

1. A method of inkjet printing a packaging material with an inkjet ink set including a free radical radiation curable liquid and at least a cyan inkjet ink, a magenta inkjet ink, a yellow inkjet ink, and a black inkjet ink, the method comprising the steps of:
jetting on a substrate the free radical radiation curable liquid including a photoinitiator and a monomer including an alkali hydrolyzable group or an oligomer including an alkali hydrolyzable group; and
at least partially curing the free radical radiation curable liquid; wherein
the alkali hydrolyzable group is located in an atomic chain between two free radical polymerizable groups of the monomer or the oligomer;
the alkali hydrolyzable group is an oxalate group; and
the substrate is the packaging material.

2. The method of inkjet printing a packaging material according to claim 1, further comprising the step of:
removing the free radical radiation curable liquid from the substrate using an alkaline liquid.

3. A method for manufacturing a conductive pattern comprising the steps of:
jetting on a substrate including a metallic surface a free radical radiation curable liquid including a photoinitiator and a monomer including an alkali hydrolyzable group or an oligomer including an alkali hydrolyzable group, the alkali hydrolyzable group being located in an atomic chain between two free radical polymerizable groups of the monomer or the oligomer;
curing the free radical radiation curable liquid into a cured free radical radiation curable liquid;
etching metal from the metallic surface; and
removing the cured free radical radiation curable liquid from the metallic surface of the substrate using an alkaline liquid; wherein
the alkali hydrolyzable group is an oxalate group.

4. A method for manufacturing a decorative etched metal panel including the steps of:
jetting on a metal panel a free radical radiation curable liquid containing a photoinitiator and a monomer including an alkali hydrolyzable group or an oligomer including an alkali hydrolyzable group, the alkali hydrolyzable group being located in an atomic chain between two free radical polymerizable groups of the monomer or the oligomer;
curing the free radical radiation curable liquid into a cured free radical radiation curable liquid;
etching metal from a metal surface of the metal panel; and
removing the cured free radical radiation curable liquid from the metal panel using an alkaline liquid; wherein
the alkali hydrolyzable group is an oxalate group.

5. The method of inkjet printing a packaging material according to claim 1, wherein the free radical radiation curable liquid further contains a colorant.

6. A method of inkjet printing comprising the steps of:
jetting on glass a free radical radiation curable liquid including a photoinitiator, a colorant, and a monomer including an alkali hydrolyzable group or an oligomer including an alkali hydrolyzable group;
curing the free radical radiation curable liquid into a cured free radical radiation curable liquid; and
removing the cured free radical radiation curable liquid from the glass using an alkaline liquid; wherein
the alkali hydrolyzable group is located in an atomic chain between two free radical polymerizable groups of the monomer or the oligomer;
the alkali hydrolyzable group is an oxalate group; and
a viscosity of the free radical radiation curable liquid at a temperature of 45° C. is less than 30 mPa·s at a shear rate of 30 s$^{-1}$.

7. The method of inkjet printing a packaging material according to claim 1, wherein the packaging material is a bottle or a jerry-can.

8. The method of inkjet printing a packaging material according to claim 1, wherein the inkjet inks in the inkjet ink set contain a vinyl ether(meth)acrylate.

9. The method for manufacturing a conductive pattern according to claim 3, wherein the free radical radiation curable liquid contains a vinyl ether(meth)acrylate.

10. The method for manufacturing a decorative etched metal panel according to claim 4, wherein the free radical radiation curable liquid contains a vinyl ether(meth)acrylate.

11. The method of inkjet printing according to claim 6, wherein the free radical radiation curable liquid contains a vinyl ether(meth)acrylate.

12. The method of inkjet printing a packaging material according to claim 1, wherein the monomer or oligomer including the alkali hydrolyzable group is selected from the group consisting of:

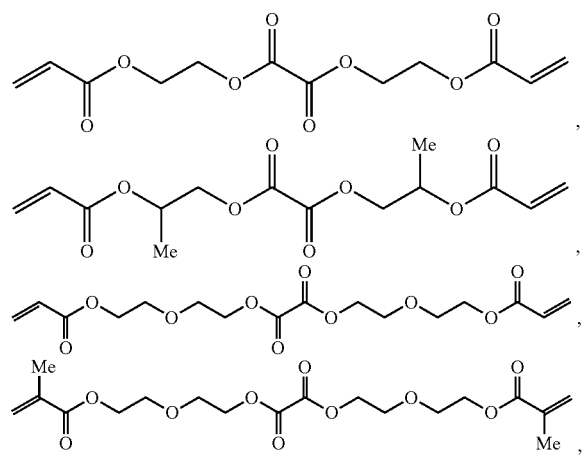

-continued

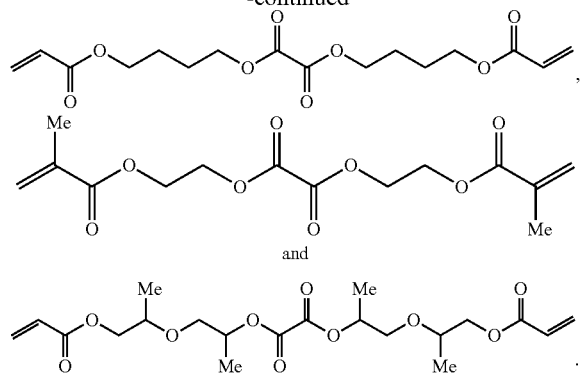

13. The method of manufacturing a conductive pattern according to claim 3, wherein the monomer or oligomer including the alkali hydrolyzable group is selected from the group consisting of:

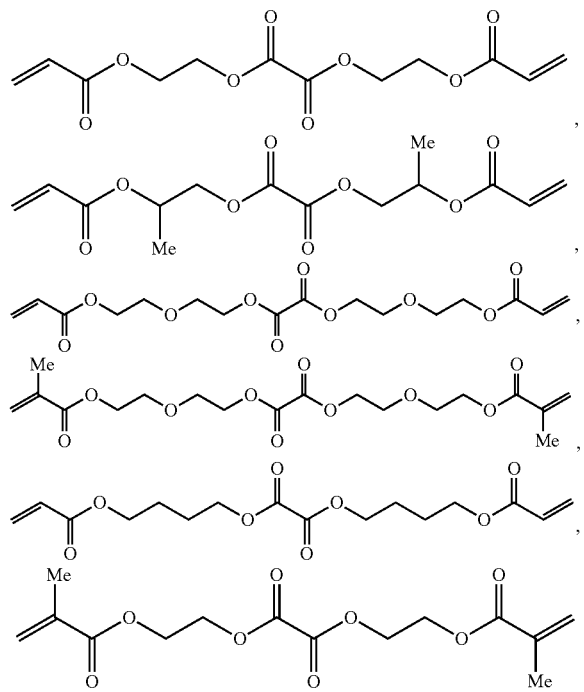

-continued

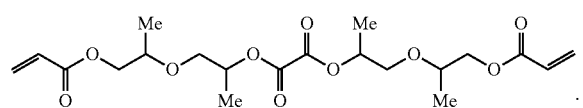

14. The method of manufacturing a decorative etched metal panel according to claim 4, wherein the monomer or oligomer including the alkali hydrolyzable group is selected from the group consisting of:

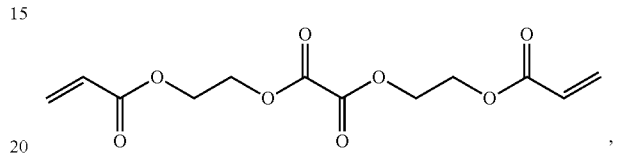

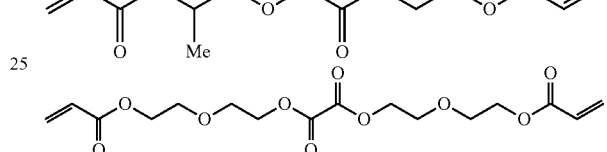

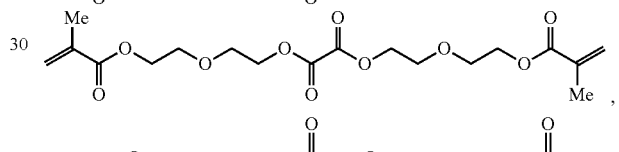

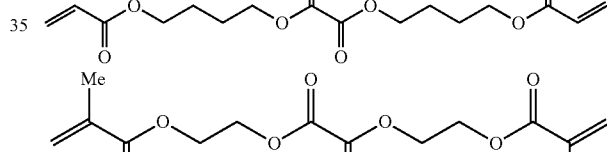

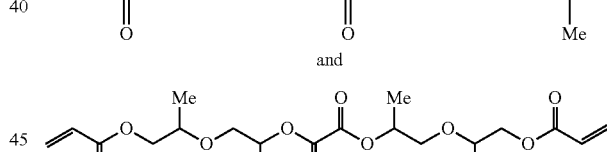

and

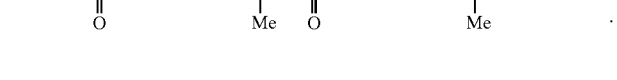

* * * * *